(12) United States Patent
Rodoni

(10) Patent No.: US 11,300,420 B2
(45) Date of Patent: Apr. 12, 2022

(54) SYSTEM, METHOD, AND APP FOR MANAGING WASTE SERVICES

(71) Applicant: RUBICON GLOBAL HOLDINGS, LLC, Atlanta, GA (US)

(72) Inventor: Philip Rodoni, Decatur, GA (US)

(73) Assignee: Rubicon Technologies, LLC, Atlanta, GA (US)

( * ) Notice: Subject to any disclaimer, the term of this patent is extended or adjusted under 35 U.S.C. 154(b) by 53 days.

(21) Appl. No.: 16/411,073

(22) Filed: May 13, 2019

(65) Prior Publication Data
US 2019/0265062 A1      Aug. 29, 2019

Related U.S. Application Data

(63) Continuation of application No. 15/684,426, filed on Aug. 23, 2017, now Pat. No. 10,288,441, which is a
(Continued)

(51) Int. Cl.
| | |
|---|---|
| G01C 21/36 | (2006.01) |
| H04W 4/02 | (2018.01) |
| G01S 5/02 | (2010.01) |
| G06F 3/0481 | (2013.01) |
| G06Q 10/06 | (2012.01) |
| G01S 19/42 | (2010.01) |
| G06F 3/04817 | (2022.01) |
| G06F 3/04842 | (2022.01) |
| G01C 21/34 | (2006.01) |

(Continued)

(52) U.S. Cl.
CPC ........... *G01C 21/36* (2013.01); *G01C 21/343* (2013.01); *G01C 21/362* (2013.01); *G01C 21/3697* (2013.01); *G01S 5/0294* (2013.01); *G01S 19/42* (2013.01); *G06F 3/04817* (2013.01); *G06F 3/04842* (2013.01); *G06Q 10/06311* (2013.01); *G06Q 10/0833* (2013.01); *G06Q 50/10* (2013.01); *G08G 1/123* (2013.01); *H04W 4/02* (2013.01); *G06F 3/0488* (2013.01)

(58) Field of Classification Search
USPC ........................................................ 701/428
See application file for complete search history.

(56) References Cited

U.S. PATENT DOCUMENTS 9,574,892 B2 *   2/2017   Rodoni ............. G01C 21/3697
9,778,058 B2 * 10/2017   Rodoni .............. G06F 3/04817
(Continued)

*Primary Examiner* — Tyler D Paige
(74) *Attorney, Agent, or Firm* — Rock IP, PLLC

(57) ABSTRACT

A system is disclosed for providing a waste management app. The system may have a locating device disposed onboard a service vehicle and configured to generate a first signal indicative of a location of the service vehicle, an input device, and a controller. The controller may be configured to receive a route assignment including waste services to be performed by the service vehicle, and to track movement of the service vehicle during performance of the waste services based on the first signal. The controller may also be configured to provide a graphical user interface for display on the input device, listing the waste services from the route assignment to be performed by the service vehicle and showing a location of the service vehicle relative to at least one location at which the waste services are to be performed.

21 Claims, 8 Drawing Sheets

Related U.S. Application Data continuation of application No. 15/420,962, filed on Jan. 31, 2017, now Pat. No. 9,778,058, which is a continuation of application No. 15/168,803, filed on May 31, 2016, now Pat. No. 9,574,892.

(60) Provisional application No. 62/183,454, filed on Jun. 23, 2015, provisional application No. 62/306,515, filed on Mar. 10, 2016, provisional application No. 62/299,183, filed on Feb. 24, 2016.

(51) Int. Cl.
*G08G 1/123* (2006.01)
*G06Q 10/08* (2012.01)
*G06Q 50/10* (2012.01)
*G06F 3/0488* (2022.01)

(56) References Cited

U.S. PATENT DOCUMENTS

| | | | | |
|---|---|---|---|---|
| 10,288,441 | B2* | 5/2019 | Rodoni | G08G 1/123 |
| 2007/0262878 | A1* | 11/2007 | Maruca | G06Q 10/06 |
| | | | | 340/686.1 |
| 2010/0167704 | A1* | 7/2010 | Villemaire | H04M 3/4878 |
| | | | | 455/414.1 |
| 2011/0279245 | A1* | 11/2011 | Hynes | G06K 17/00 |
| | | | | 340/10.42 |
| 2014/0379588 | A1* | 12/2014 | Gates | G06Q 10/30 |
| | | | | 705/308 |
| 2016/0377445 | A1* | 12/2016 | Rodoni | G06Q 10/0833 |
| | | | | 701/428 |
| 2016/0379152 | A1* | 12/2016 | Rodoni | H04W 4/02 |
| | | | | 705/7.15 |
| 2019/0005466 | A1* | 1/2019 | Rodoni | G06Q 10/30 |
| 2019/0265062 | A1* | 8/2019 | Rodoni | G01S 19/42 |
| 2020/0143336 | A1* | 5/2020 | Klinkhamer | H04L 9/3239 |

* cited by examiner

SYSTEM, METHOD, AND APP FOR MANAGING WASTE SERVICES

RELATED APPLICATIONS

This application is a continuation of U.S. application Ser. No. 15/684,426 filed Aug. 23, 2017, which is a continuation of Ser. No. 15/420,962, filed on Jan. 31, 2017, now U.S. Pat. No. 9,778,058 issued Oct. 3, 2017, which is a continuation of U.S. application Ser. No. 15/168,803, filed on May 31, 2016, now U.S. Pat. No. 9,574,892, issued Feb. 21, 2017, which is based on and claims priority to U.S. Provisional Application Nos. 62/183,454 filed on Jun. 23, 2015; 62/299,183 filed on Feb. 24, 2016; and 62/306,515 filed on Mar. 10, 2016, the contents of all of which are expressly incorporated herein by reference

TECHNICAL FIELD

The present disclosure relates generally to an app (i.e., a downloadable self-contained software application) for use on a mobile device. More particularly, the present disclosure relates to a system and method for providing a waste management app that allows an operator of a service vehicle to manage waste services.

BACKGROUND

Commercial and residential waste service providers typically dispatch service vehicles to customer properties according to a predetermined pickup schedule assigned to each service vehicle. The pickup schedule for each service vehicle is often designed to provide waste services (e.g., to empty waste receptacles) within a particular geographical area and at a particular frequency (e.g., once per week). After completion of the waste services, the service vehicle operator may report the completion to a back office, which updates the operator's schedule and an account record for the customer. Customers that subscribe to these waste services are then billed based on the account record. The operator then maneuvers the service vehicle to a next customer location for completion of additional waste services.

In some instances, it may be difficult to manage the pickup schedule for each service vehicle. In particular, the pickup schedule can change frequently, and include new customer locations and/or locations having complex service requirements. In these instances, it can be difficult for the service vehicle operator to determine which stops to make, the order of the stops, the timing of the stops, etc. It can also be difficult to find the new locations, to determine travel routes to new locations, to manage instructions associated with required services at each location, and to keep track of the completed services. No tools currently exist to help the service vehicle operator with these aspects of waste management.

The disclosed system, method, and app are directed to overcoming one or more of the problems set forth above and/or other problems of the prior art.

SUMMARY

In one aspect, the present disclosure is directed to a system for providing a waste management app. The system may include a locating device disposed onboard a service vehicle and configured to generate a first signal indicative of a location of the service vehicle. The system may also include an input device, and a controller in communication with the locating device and the input device. The controller may be configured to receive a route assignment including waste services to be performed by the service vehicle, and to track movement of the service vehicle during performance of the waste services based on the first signal. The controller may also be configured to provide a graphical user interface for display on the input device. The graphical user interface may show a listing the waste services from the route assignment to be performed by the service vehicle, and a location of the service vehicle relative to at least one location at which the waste services are to be performed.

In another aspect, the present disclosure is directed to a method for providing a waste management app. The method may include receiving a route assignment including waste services to be performed by a service vehicle, and tracking movement of the service vehicle during performance of the waste services. The method may also include providing a graphical user interface for display to an operator of the service vehicle. The graphical user interface may list the waste services from the route assignment to be performed by the service vehicle and show a location of the service vehicle relative to at least one location at which the waste services are to be performed.

In yet another aspect, the present disclosure is directed to a non-transitory computer readable medium containing computer-executable programming instructions for performing a method of providing a waste management app. The method may include receiving a route assignment including waste services to be performed by a service vehicle at a plurality of locations, and tracking movement of the service vehicle during performance of the waste services. The method may also include providing a graphical user interface for display to an operator of the service vehicle. The graphical user interface may list the waste services from the route assignment in an order to be performed by the service vehicle, and show on a map a location of the service vehicle relative to the plurality of locations at which the waste services are to be performed.

DETAILED DESCRIPTION

Figure 1:
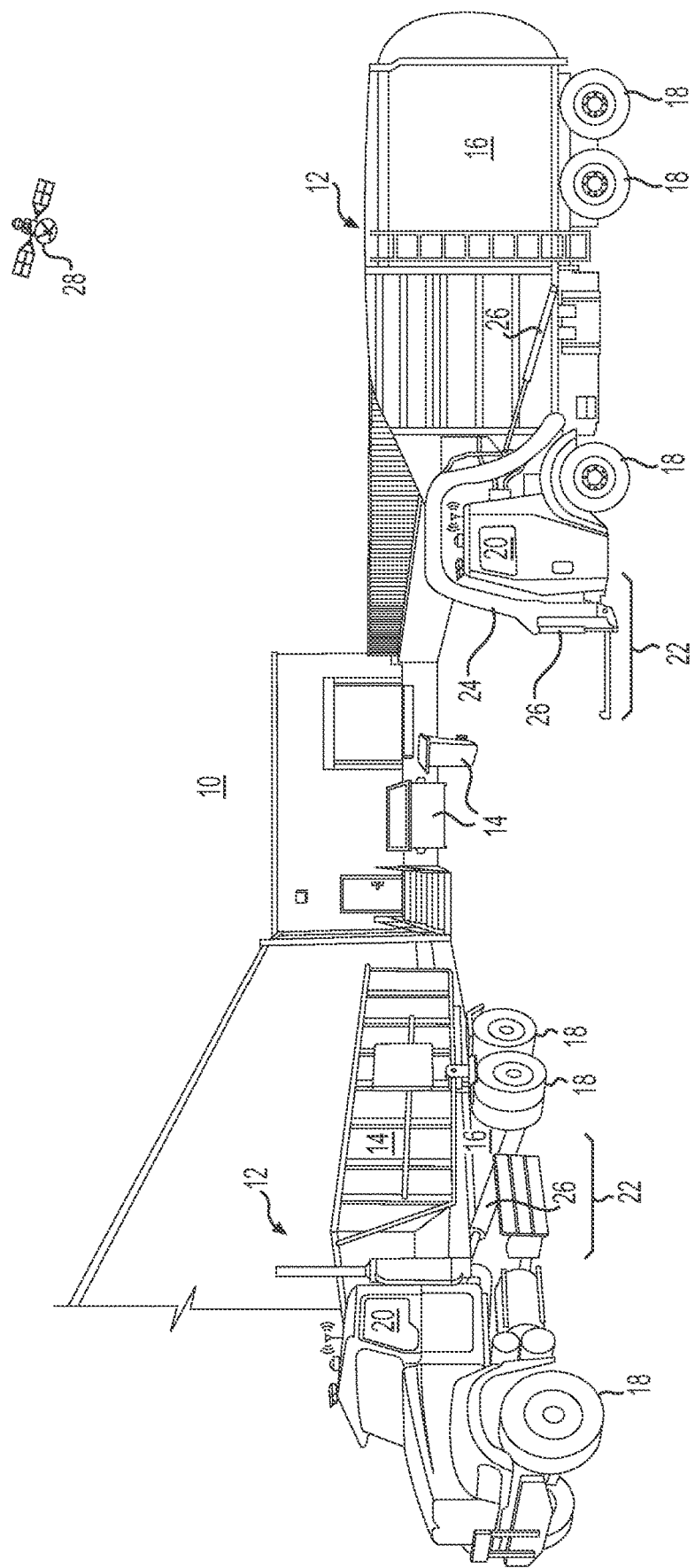
FIG. 1 is a perspective illustration of an exemplary disclosed waste management environment.

FIG. 1 illustrates an exemplary waste management environment ("environment") 10, at which one or more service vehicles 12 are providing waste services. Environment 10 may include a retail store, a factory, a government building, a residential address, or another location having one or more receptacles 14 that require the service of service vehicle(s) 12. The service may include, for example, the removal of waste materials from inside of receptacle(s) 14, the replacement of receptacle(s) 14, and/or the placement of new or additional receptacles 14.

Service vehicle 12 may take many different forms. In the example shown on the right in FIG. 1, service vehicle 12 is a hydraulically actuated, front-loading type of service vehicle. Specifically, service vehicle 12 may include a bed 16 supported by a plurality of wheels 18, a cab 20 located forward of bed 16, and a lifting device 22 extending forward of cab 20. Lifting device 22 may consist of, among other things, one or more lift arms 24 configured to engage and/or grasp receptacle 14, and one or more actuators 26 powered by pressurized oil to raise and tilt lift arms 24 (and receptacle 14) up past cab 20 to a dump location over bed 16. After dumping of receptacle 14, pressurized oil may be released from hydraulic actuator(s) 26 to allow lowering of lift arms 24 and receptacle 14 back to the ground in front of service vehicle 12.

In other examples, lifting device 22 may be located to pick up receptacles 14 from a side and/or a rear of service vehicle 12. In yet other examples, receptacles 14 may be manually lifted and dumped into bed 16. In any of these examples, bed 16 could be outfitted with a compactor (not shown) to compact the waste material after the material is dumped into bed 16, and/or a door (not shown) configured to close an opening of bed 16 through which the waste material is dumped. Other configurations may also be possible.

In the example shown on the left in FIG. 1, service vehicle 12 is a hydraulically actuated flatbed or roll-off type of service vehicle. Specifically, service vehicle 12 may include a bed 16 supported by a plurality of wheels 18, a cab 20 located forward of bed 16, and a lifting device 22 extending rearward of cab 20. Lifting device 22 may consist of, among other things, one or more actuators 26 powered by pressurized oil to raise and tilt receptacle 14 up onto bed 16 for transportation of receptacle 14 away from environment 10. After dumping of receptacle 14 at a landfill (or swapping a full receptacle 14 for an empty receptacle 14), receptacle 14 may be returned to environment 10 and lowered back to the ground behind service vehicle 12 (e.g., by releasing pressurized oil from hydraulic actuator(s) 26).

As each service vehicle 12 moves about environment 10, a satellite 28 or other tracking device may communicate with an onboard controller 30 (shown only in FIG. 2) to monitor the movements of service vehicle 12 and the associated changes made to environment 10 (e.g., pickup, dumping, placement, etc.). As will be explained in more detail below, onboard controller 30, or a separate offboard controller 32 (e.g., a controller 32 located in a back office 34 or other service facility—shown only in FIG. 2), may then manage future operations of service vehicle 12 (and other similar service vehicles 12) based on these movements and changes.

Both of onboard and offboard controllers 30, 32 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
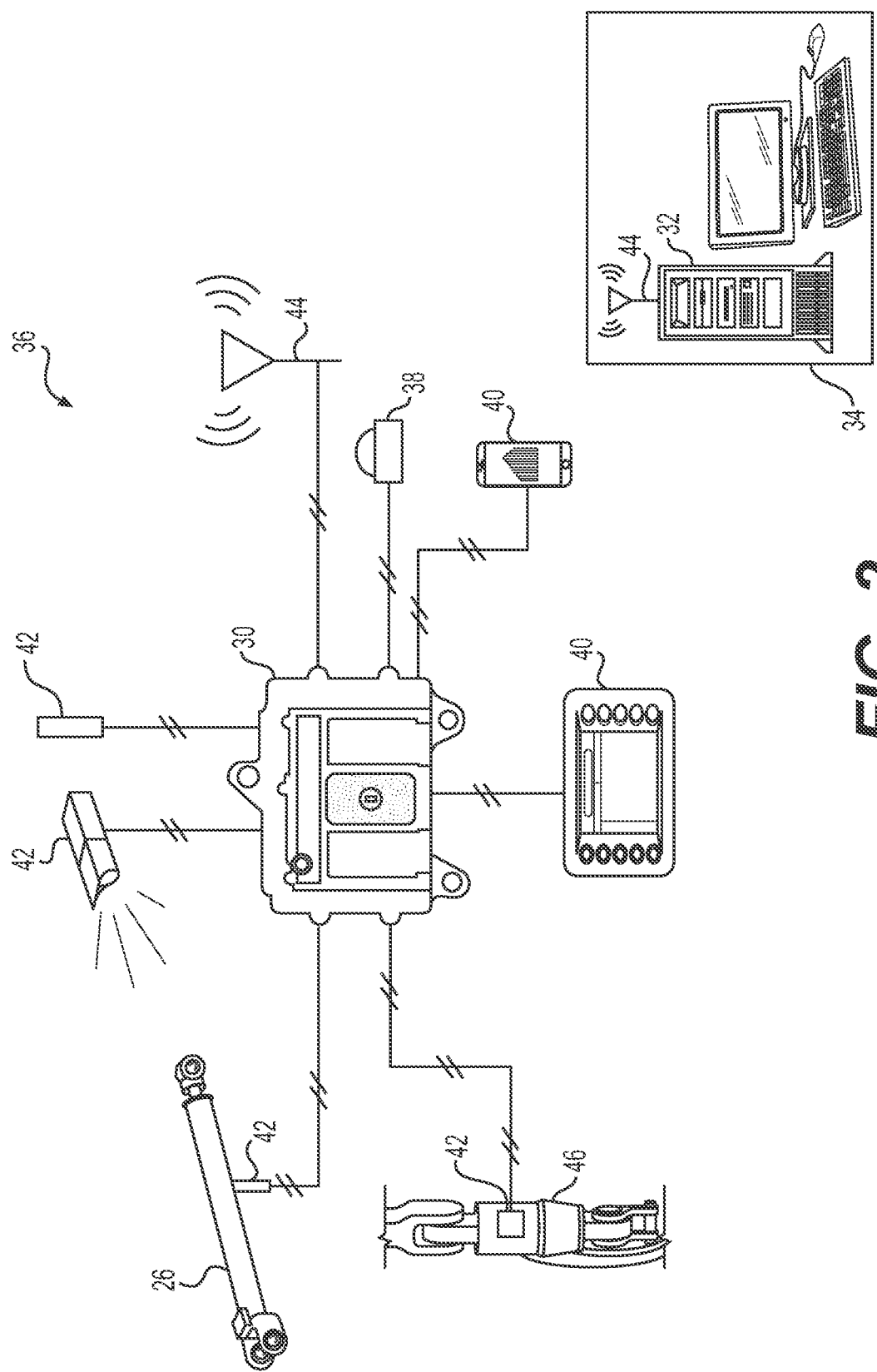
FIG. 2 is a diagrammatic illustration of an exemplary disclosed system that may be used to manage the environment of FIG. 1.

As shown in FIG. 2, onboard controller 30 may form a portion of a waste management system ("system") 36 that is configured to track, assist, and/or control movements of service vehicle(s) 12 (shown only in FIG. 1). In addition to onboard controller 30, system 36 may also include a locating device 38, and at least one of a manual input device 40 and a sensor 42 mounted or otherwise located onboard each service vehicle 12. In some embodiments, system 36 includes both manual input device 40 and one or more sensors 42. In other embodiments, sensor 42 (and/or onboard controller 30) may be internal to manual input device 40. Onboard controller 30 may be in communication with each of these other components and/or with offboard controller 32 at back office 34 (e.g., via a communication device 44), and configured to determine, based on signals from these components and based on other known information stored in memory, the location of each service vehicle 12 and characteristics and locations of receptacles 14 being moved by and/or in a vicinity of each service vehicle 12.

Locating device 38 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 28 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. In some embodiments, locating device 38 may also be configured to determine a location and/or orientation of a particular part of service vehicle 12, for example of lift arms 24 (shown only in FIG. 1). Based on the signals generated by locating device 38 and based on known kinematics of service vehicle 12, onboard controller 30 may be able to determine in real time, the position, heading, travel speed, acceleration, and orientation of service vehicle 12 and lift arms 24. This information may then be used by onboard and/or offboard controllers 30, 32 to update the locations and conditions of service vehicle(s) 12 and/or receptacles 14 in an electronic map or database of environment 10.

It is contemplated that locating device 38 may take another form, if desired. For example, locating device 38 could be an RFID reader configured to interact with an RFID tag located within environment 10 (e.g., at a customer location, on receptacle 14, etc.), or another type of scanner configured to read another type of indicia (e.g., a barcode) within environment 10. Based on the reading of the RFID tag or other indicia, the location and/or orientation of service vehicle 12 may be linked to the known location of the RFID tag or other indicia within environment 10.

Manual input device 40 may provide a way for an operator of service vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about the receptacle and waste engaged by, loaded into, or otherwise processed by service vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 40, if desired. In addition to receiving manual input from an operator, input device 40 may also be capable of displaying information, for example the electronic map of environment 10, instructions from back office 34, scheduling, receptacle information (e.g., ID, configuration, location, weight, etc.), payload information (e.g., weight and/or volume), questions, etc.

In some embodiments, input device 40 may be configured to execute an application. For example, when input device 40 is a mobile device (for example a smartphone), the application can be a mobile app ("app"). An app is an abbreviated term for a "software application", which is downloadable to and executable by a mobile device (e.g., a laptop, a smart phone, or a tablet). The disclosed waste management app can provide a graphical user interface (GUI) configured to display information about a waste handling operation to the operator of service vehicle 12; and that receives input from the operator used to configure acquisition of operational data by sensor(s) 42, to transmit the operational data to controllers 30, 32, to receive and display information about a current operation (e.g., as monitored by sensor(s) 42), etc.

Sensors 42 may be configured to monitor parameters associated with the waste material loaded into service vehicle 12 and/or the associated receptacles 14 being moved by service vehicle 12 (e.g., moved by lift arms 24), and to generate corresponding signals indicative thereof. Each of these sensors 42 may be any type of device known in the art, and located anywhere on or in service vehicle 12. In one example, sensor 42 may embody a lift sensor, such as any one or more of a load cell, a force gauge, a pressure sensor, a motion sensor, or another type of lift sensor associated directly with lift arms 24, with actuator(s) 26, with receptacle 14, and/or with a strut 46 supporting bed 16. In this example, the signals generated by sensor(s) 42 may correspond with strain on lift arms 24, with a force applied to lift arms 24 by actuator(s) 26, with a payload weight of bed 16, with a motion of receptacle 14, with a weight of waste contained inside receptacle 14, etc.

Alternatively, one or more sensors 42 may be associated with a power source or drivetrain of service vehicle 12, and configured to generate signals indicative of an amount of power used to propel service vehicle 12, to drive the hydraulics of actuators 26, to move the in-bed compactor, or to shut the associated door. Other types of sensors 42 (e.g., cameras, spectrometers, IR sensors, RADAR sensors, LIDAR sensors, etc.) may also be utilized to determine characteristics (e.g., load profile, volume, and/or shape) of the waste material inside receptacles 14 or of receptacles 14 themselves. In yet further examples, sensor 42 could be an acoustic sensor (e.g., one or more microphones), an accelerometer, or another similar type of sensor configured to detect engagement conditions and/or cycle completion of lift arms 24, the in-bed compactor, the door, etc. during lifting, dumping, and/or shaking of receptacle 14. Other types of sensors 42 may alternatively or additionally be utilized. Signals generated by these sensors 42 may be communicated to onboard and/or offboard controllers 30, 32, and the appropriate controller may use the signals to determine conditions surrounding receptacles 14 (and/or the waste inside receptacles 14) before, during, and/or after servicing by service vehicle 12. As described above, any one or more of sensors(s) 42 may form an integral portion of input device 40 (e.g., the smartphone or tablet carried by the operator) or be a standalone component in wired or wireless communication with controllers 30, 32 and/or input device 40, as desired.

Onboard controller 30 may be configured to manage communications between other onboard components and offboard controller 32 located at back office 34. For example, onboard controller 30 may receive signals from locating device 38, input device(s) 40, and sensor(s) 42, and correlate the signals, filter the signals, buffer the signals, record the signals, or otherwise condition the signals before directing the signals offboard via communication device 44.

Communication device 44 may be configured to facilitate communication between onboard controller 30 and offboard controller 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and offboard controller 32 may communicate directly with locating device 38, input device(s) 40, and/or sensor(s) 42 via communication device 44, if desired. Other means of communication may also be possible.

Onboard and/or offboard controllers 30, 32, based on the information received from onboard service vehicles 12 and also based on information received from other sources (e.g., from the Internet, from input at back office 34, etc.), can be configured to execute instructions stored on computer readable medium to perform methods of waste management at environment 10. For example, onboard and/or offboard controllers 30, 32 may be configured to monitor when service vehicle 12 is nearing a target location (e.g., based on the known address and signals from locating device 38), when service vehicle 12 has stopped, when service vehicle 12 is servicing receptacle 14, when service vehicle 12 is filled with waste to a maximum capacity, etc. This monitoring may then be used to determine route assignments for service vehicle 12, determine business costs and efficiencies, determine service opportunities, make route adjustments, etc.

FIGS. 3-11 represent exemplary Graphical User Interfaces (GUIs) that may be shown in connection with the disclosed waste management app on any input device 40 for use by an operator of service vehicle 12 to access system 36. FIGS. 3-11 will also be discussed in greater detail below to further illustrate the disclosed concepts.

INDUSTRIAL APPLICABILITY

The disclosed system, method, and app may be applicable to the waste service industry, where efficient management of waste services can affect profitability for a provider. The disclosed system, method, and app may provide a way for individual service vehicle operators to visually receive the daily tasks assigned to a particular service vehicle in an organized manner. For example, the disclosed system, method, and app may provide a graphical user interface (GUI) allowing the operator to see a schedule of the daily tasks arranged in an order that reduces time, effort, and fuel, and also satisfies customer expectations. The GUI provided by the disclosed app may also relay to the operator visual directions to customer locations and special instructions for each location. In addition, the GUI may provide visual status indications associated with the daily tasks, and a way for the operator to provide feedback or other input regarding the tasks, the customer locations, the service vehicle, the schedule, etc. Exemplary GUIs associated with the disclosed app will now be described in detail, with reference to FIGS. 3-11.

During operation of system 36 a schedule of customer locations may be generated at back office 34 (referring to FIG. 2) for each service vehicle 12 (referring to FIG. 1) in the service fleet of a particular service provider. The schedule may be created in any manner known in the art. For example, the schedule may be created based on contracts for service, which detail geographical locations at which a particular customer desires particular waste services to be performed, a timing (e.g., date, day, time, and/or frequency) of the services, and details about the services (e.g., a number, configuration, position, and/or size of receptacles 14 at the customer location that require service; a type of waste; and/or instructions regarding access to receptacles 14). In addition, the schedules may be created based on the particular service vehicles 12 that are available to perform the services. These details may include a number, type, size, location, capacity, and availability of service vehicles 12. The contract and/or service vehicle information may be received directly from the customer(s), from representatives of the service provider of system 36, from service vehicles 12 (and/or their operators), and/or from an electronic data storage, memory, or database of system 36. The assignments may be determined and/or assigned manually (e.g., by a service representative) or automatically (e.g., by offboard controller 32) using any strategy known in the art, and subsequently relayed to the operator of each service vehicle 12 (e.g., by way of communication device 44). Each route assignment may include a plurality of service stops, which are sequentially arranged and provided with target times for completion of associated service tasks. The route assignments may then be stored, for example within onboard controller 30, and/or communicated to any of input devices 40.

Figure 3:
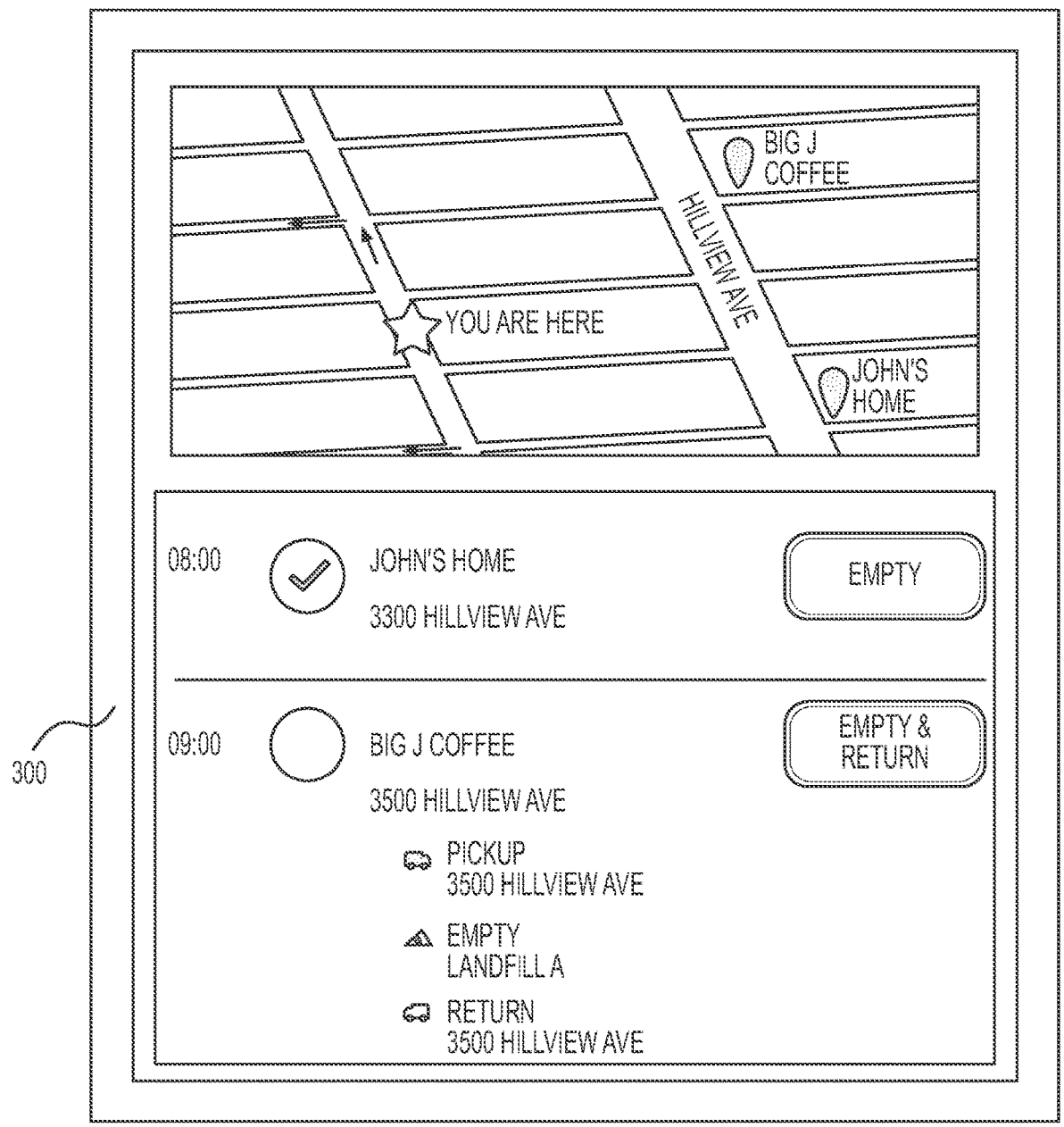
FIGS. 3-11 are diagrammatic illustrations of exemplary disclosed graphical user interfaces that may be used to access the system of FIG. 2.
Figure 4:
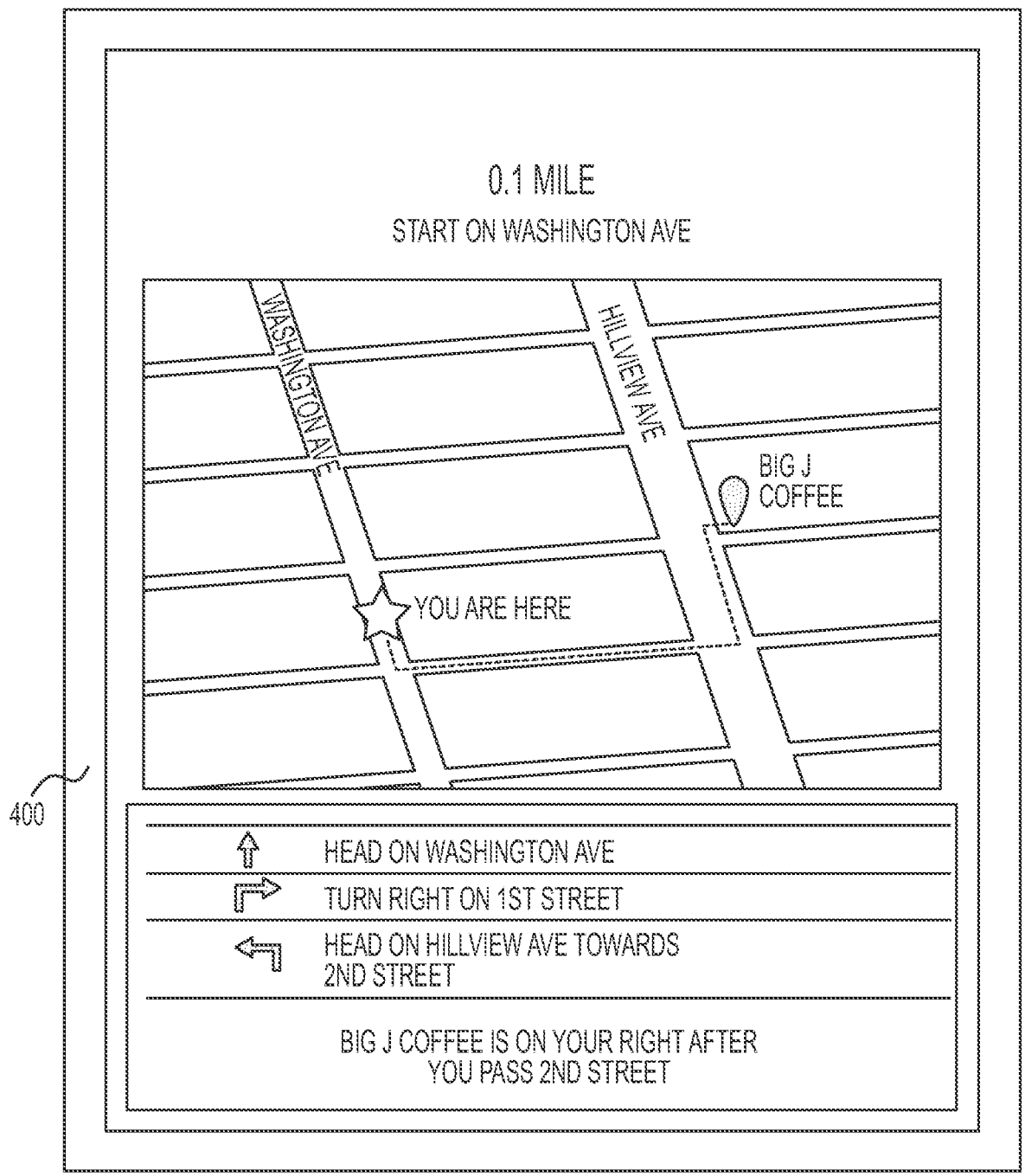
Figure 5:
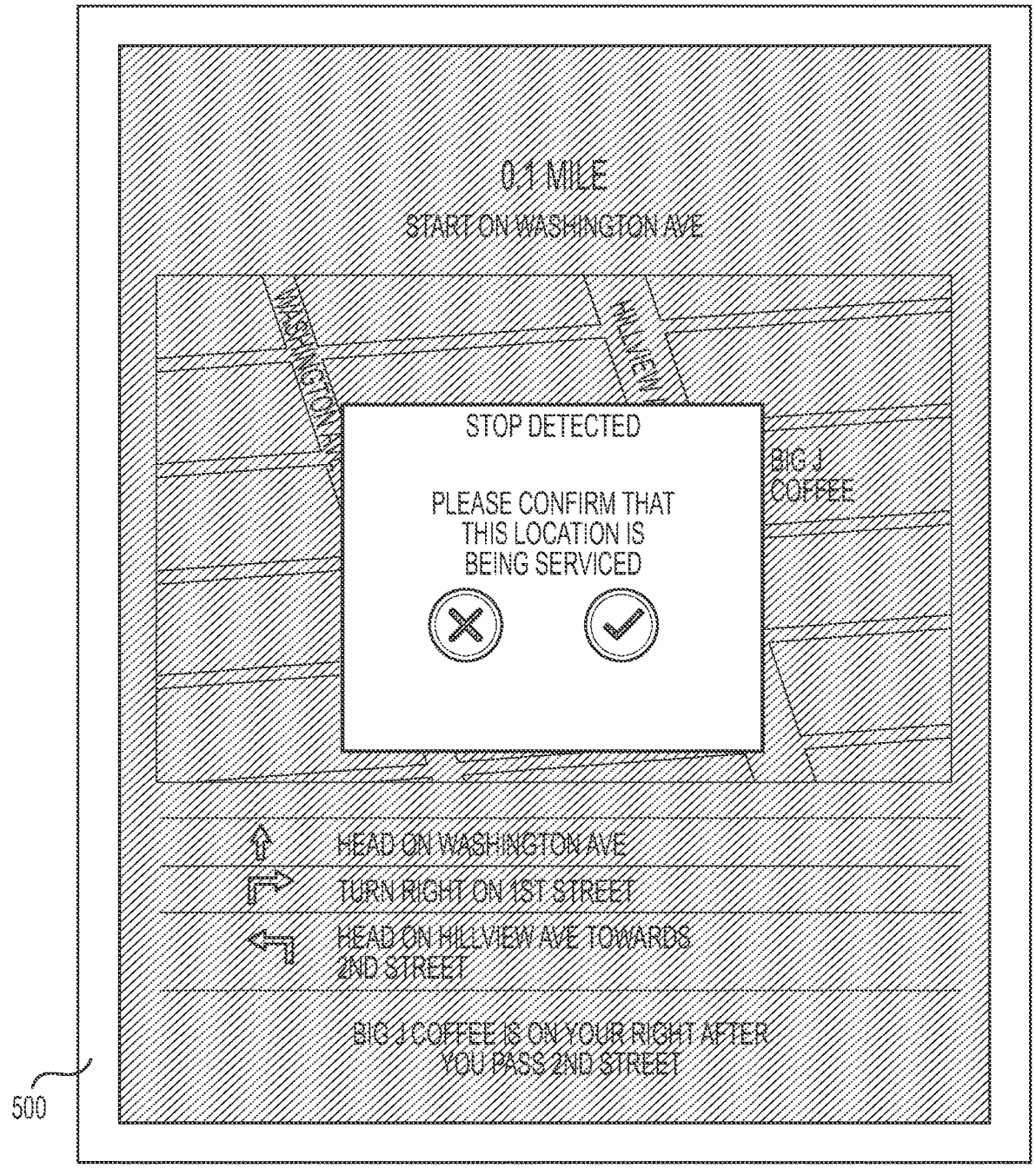

FIG. 3 shows an exemplary GUI 300 that may be provided in connection with the disclosed app on any input device 40 (e.g., on a smartphone carried by the operator of service vehicle 12) at start of a shift for a particular operator within a particular service vehicle 12. In this example, GUI 300 displays to the operator a corresponding route assignment received from back office 34. The route assignment may include a listing of scheduled stops provided in a particular order (e.g., a top-to-bottom order) that the operator should follow. The listing may include a name of each stop, an address of each stop, a desired service time for each stop, and instructions regarding particular service tasks (e.g., pickup, empty, return, etc.) to be performed at each stop. In addition, GUI 300 may display a visual indication as to which service tasks have been completed, and a map showing one or more stop locations relative to a current position of service vehicle 12 (obtained via location device 38).

In the example shown in FIG. 3, two stops are listed in the route assigned to the operator of a particular service vehicle 12. The two stops include a first stop at John's Home and a second stop at Big J Coffee. It should be noted that each route assignment could include any number of stops. John's Home is shown as being located at 3300 Hillview Ave and has a scheduled service time of 8:00 am. Big J. Coffee is shown as being located at 3500 Hillview Ave and has a later scheduled service time of 9:00 am. The service to be completed at John's Home is simply to empty an existing receptacle 14 into bed 16 of service vehicle 12, while the service to be completed at Big J Coffee is to pick up an existing receptacle 14, take the receptacle 14 to a particular land fill (i.e., to Landfill A), and then to return the empty receptacle 14 back to Big J Coffee. Other service tasks could also or alternatively be associated with each stop, as desired. The service at John's Home is shown as having been completed (e.g., with a checkmark).

The completion of service at a particular stop in an assigned route may be confirmed manually and/or automatically, as desired. For example, upon completion of a particular service task at a particular location, the operator of service vehicle 12 may provide manual input indicative of the completion to input device 40. This input could include, for example, pressing of a button, touching of a screen (e.g., touching the checkmark area shown in FIG. 3 at the left of "John's Home"), voicing an audible command, etc. In other embodiments, however, completion of the particular task could be automatically confirmed based on a tracked location, motion, and/or speed of service vehicle 12 (e.g., by detecting a stop at John's Home) performed by locating device 38; based on input received from sensor(s) 42 (e.g., a detected increase in weight of bed 16, a detected lifting/tilting motion of lift arms 24, a detected force increase of actuators 26, a detected acoustic signature associated with normal lifting/tilting/dumping of receptacle 14, a scanned barcode of receptacle 14 located at John's Home, a captured image of John's Home, etc.); and/or based on other information.

After confirmation is received that waste services at a particular stop in the assigned route have been completed, the map shown in GUI 300 may represent the relative location associated with a next stop in the route. That is, after completion of a service task at one stop, the disclosed app may cause the map to be automatically updated and correspond with the next stop. It is also contemplated that the operator may manually request the relative location associated with any particular stop to be shown in the map of GUI 300, if desired, regardless of the status of a particular service task.

In one embodiment, the operator of service vehicle 12 may be able to obtain more detailed information about the next (or any selected) stop in the assigned route. This additional information may be requested, for example, by the operator touching, tapping, or otherwise providing input to the map and/or the listing areas in GUI 300. In the disclosed examples, the operator has touched the Big J Coffee listing in GUI 300, causing the exemplary GUI 400 of FIG. 4 to be displayed.

GUI 400 may provide a zoomed-in view of a portion of the map from GUI 300, as well as directions and/or a proximity value corresponding to the selected location. It is contemplated that the zoomed-in view and/or the other details from GUI 400 could additionally or alternatively be automatically shown to the operator based on proximity of service vehicle 12 to the particular location, if desired. For example, when service vehicle 12 is detected to be within a threshold distance (e.g., about 0.5 miles) of the next stop in the assigned route, the disclosed app may automatically cause GUI 400 to be shown.

It should be noted that the operator may be able to manually select a particular stop out of sequential order from the assigned route to service next, if desired. That is, the operator could override input device 40 and choose a stop (e.g., by touching, tapping, or providing other input to device 40) that is not listed as the next stop in the provided sequence. The operator may do this, for example, when bed 16 is nearly full and the stop listed next in the route would overfill bed 16. In this example, the operator may choose instead to visit a stop known to have a lesser amount of waste that could be handled by service vehicle 12 without overfilling bed 16. In another example, back office 34 may override input device 40 and inform the operator via a dispatch call of the need to go to the stop that is not listed next in the provided sequence. This may occur, for example, in urgent or emergency situations. Regardless of the reason for the out-of-sequence stop, once the out-of sequence stop is selected by the operator to be the next stop, the app providing GUIs to input device 40 may be able to accommodate the out-of-sequence stop and cause GUI 400 to provide directions and/or detailed information to the out-of-sequence stop.

The disclosed app may provide for manual confirmation of service vehicle 12 stopping at an intended service location. For example, based on an amount of detected motion, a detected speed, a detected location, a detected use of lift arms 24, a detected force, a detected change in bed weight, or another detected condition, controller 30 may determine that service vehicle 12 has stopped. In this situation, the disclosed app may be configured to confirm that the detected stop corresponds with an intended stop in the assigned route, for example via a GUI 500 shown in FIG. 5. The operator may then have the option to confirm or deny that the stop is one of the intended stops listed in the assigned route. In some embodiments, this feedback from the operator may be used to selectively activate other functions and/or features of service vehicle 12. For example, in some embodiments, sensors 42 may only be activated when the operator confirms that the detected stop is one of the listed stops.

Figure 6:
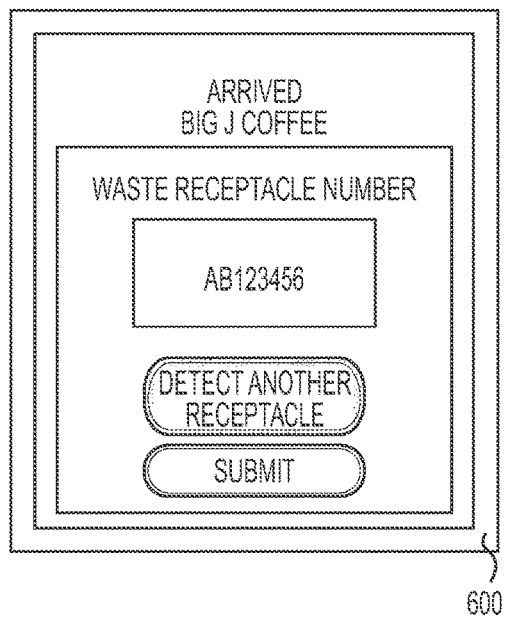
Figure 7:
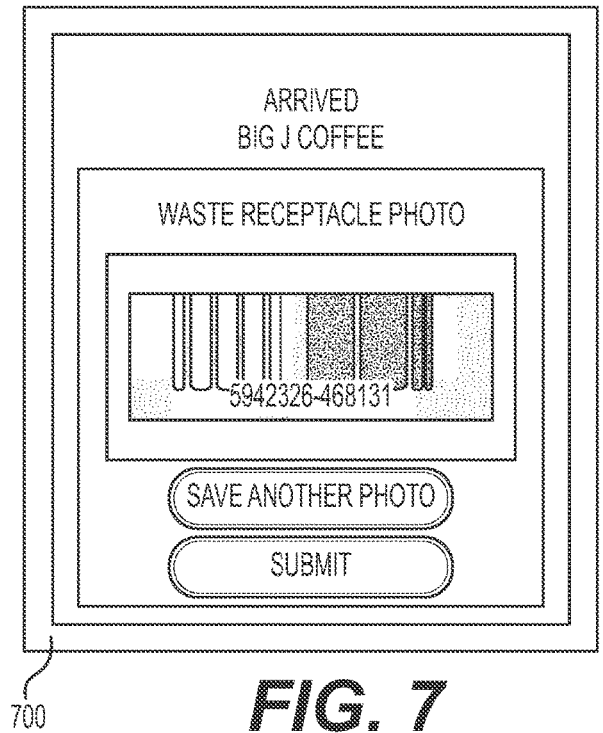

While service vehicle 12 is at a particular stop in its assigned route, any number of different pieces of information about the stop and/or receptacles 14 at the stop may be automatically and/or manually obtained and entered into input device 40. FIGS. 6 and 7 depict different exemplary GUIs 600 and 700, respectively, that are provided by the disclosed app and used for this purpose. For example, upon arriving at the particular stop, GUIs 600 and 700 may provide a way to identify the corresponding receptacle 14 that should be serviced and/or to link the receptacle's identity to a particular stop and/or service task. This may include input device 40 displaying an identification number, a size, a configuration, and/or a picture of the receptacle 14 expected to be at the particular stop, so that the operator of service vehicle 12 may confirm service of a correct receptacle 14 at a correct location. Alternatively, GUI 600 may allow the operator to manually supply the receptacle information to input device 40. For example, the operator may type into GUI 600 the identification number of the receptacle 14 found at the stop, scan into GUI 700 an associated bar code, upload a photo, etc. In this example, if the entered receptacle information does not match expected information, an indication of the mismatch may be displayed via input device 40 to the operator, such that the operator may remedy the situation.

Figure 8:
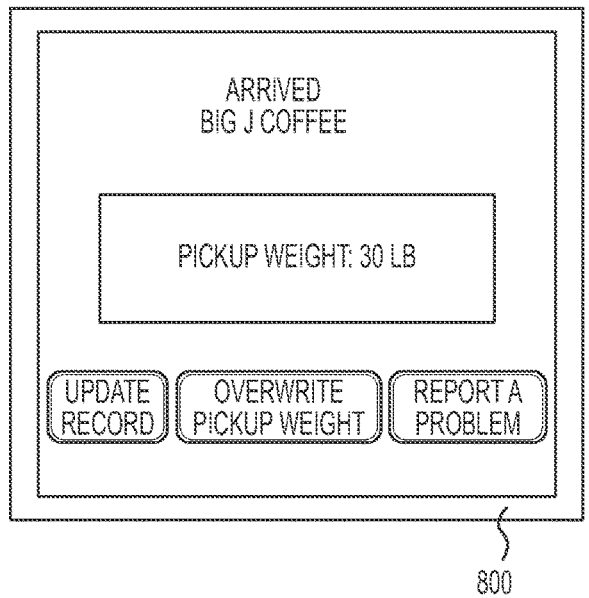
Figure 9:
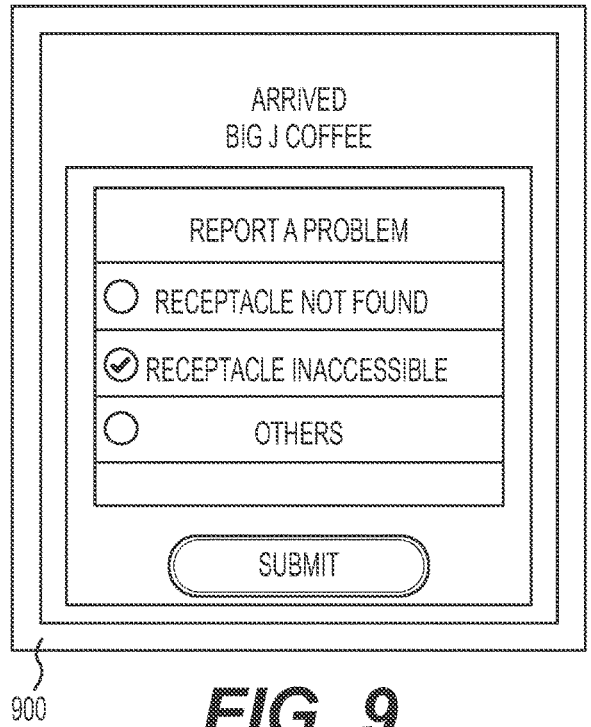

Also, while service vehicle 12 is at a particular stop in its assigned route, exemplary GUIs 800 and 900 of FIGS. 8 and 9, respectively, may be used to provide information about the service task being performed at the stop. For example, a weight of any waste dumped from receptacle 14 into bed 16 of service vehicle 12 at the particular stop may be recorded via GUI 800. The weight may be recorded automatically (e.g., based on input from sensors 42) or manually (e.g., based on an external scale at the stop or built into the receptacle 14), as desired. GUI 800 may also provide the option for the operator to adjust the information displayed on GUI 800 (e.g., to update a record or overwrite a pickup weight or volume) and/or to report a problem. Via GUI 900, the operator may then be able to provide details regarding any problem experienced when attempting to service receptacle 14. Exemplary problems reportable via GUI 900 may include, among others, that receptacle 14 cannot be found, that receptacle 14 is inaccessible, or that other problems have occurred. Any information obtained via GUIs 800 and/or 900 may be transmitted to back office 34 and used to update the corresponding customer accounts.

Figure 10:
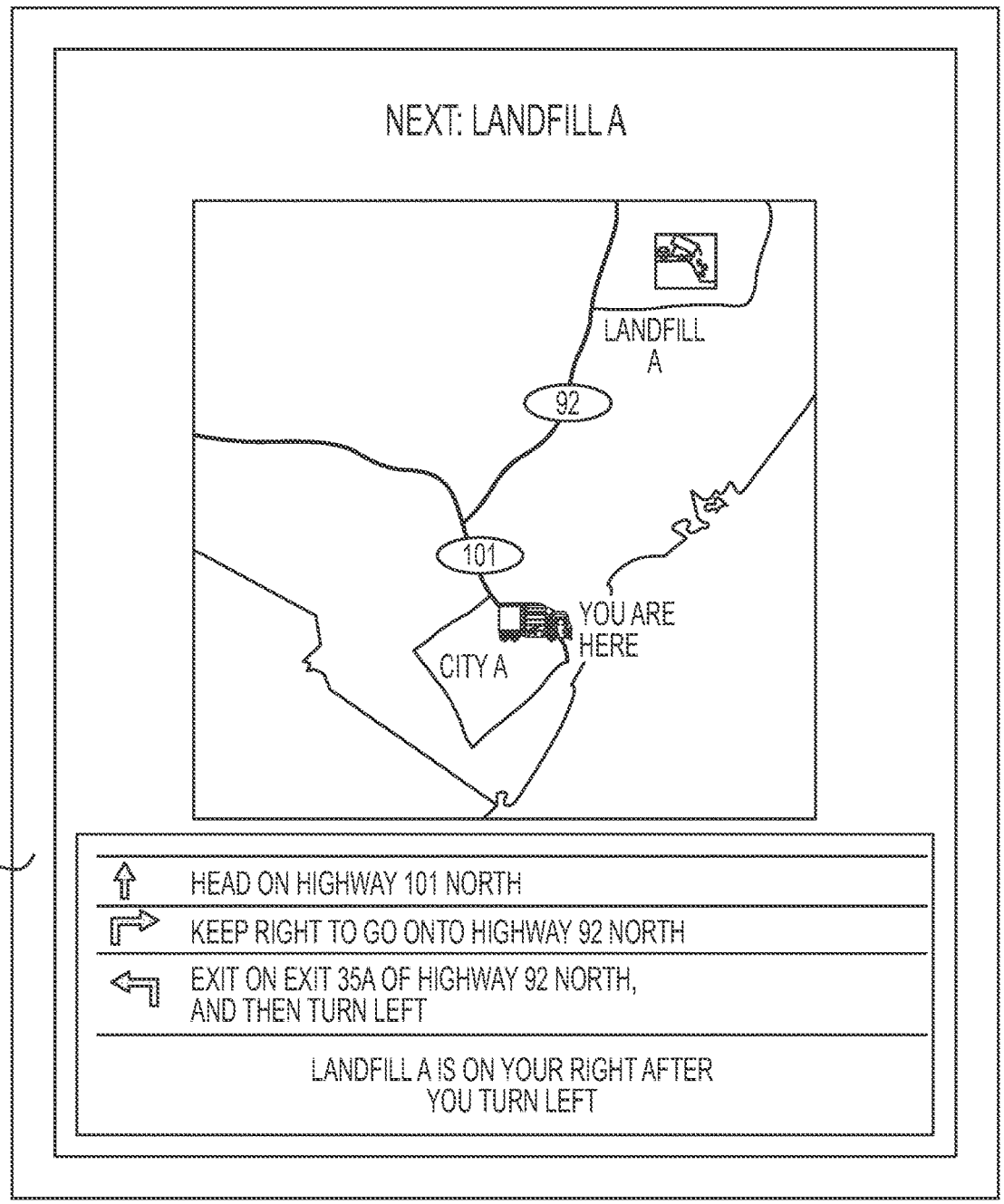

FIG. 10 illustrates an exemplary GUI 1000 that may be shown when bed 16 of service vehicle 12 is nearly full (e.g., full within a threshold amount), based on detected and/or confirmed completion of a previous waste service known to supersede travel to the landfill, based on detected approach of service vehicle 12 to the landfill, and/or based on other similar factors. The fill level of bed 16 may be determined automatically (e.g., based on a number of stops completed and an assumed amount of material at each stop, based on a measured weight or volume, etc.) or manually (e.g., based on operator input). The threshold amount may be associated with a known capacity of service vehicle 12, local regulations, or other factors known in the art. GUI 1000 may illustrate a map and/or navigation information for assisting the operator to drive service vehicle 12 to a particular landfill (e.g., to Landfill A) and/or to a particular location within the landfill (e.g., a location corresponding to a type of waste contained within bed 16).

Figure 11:
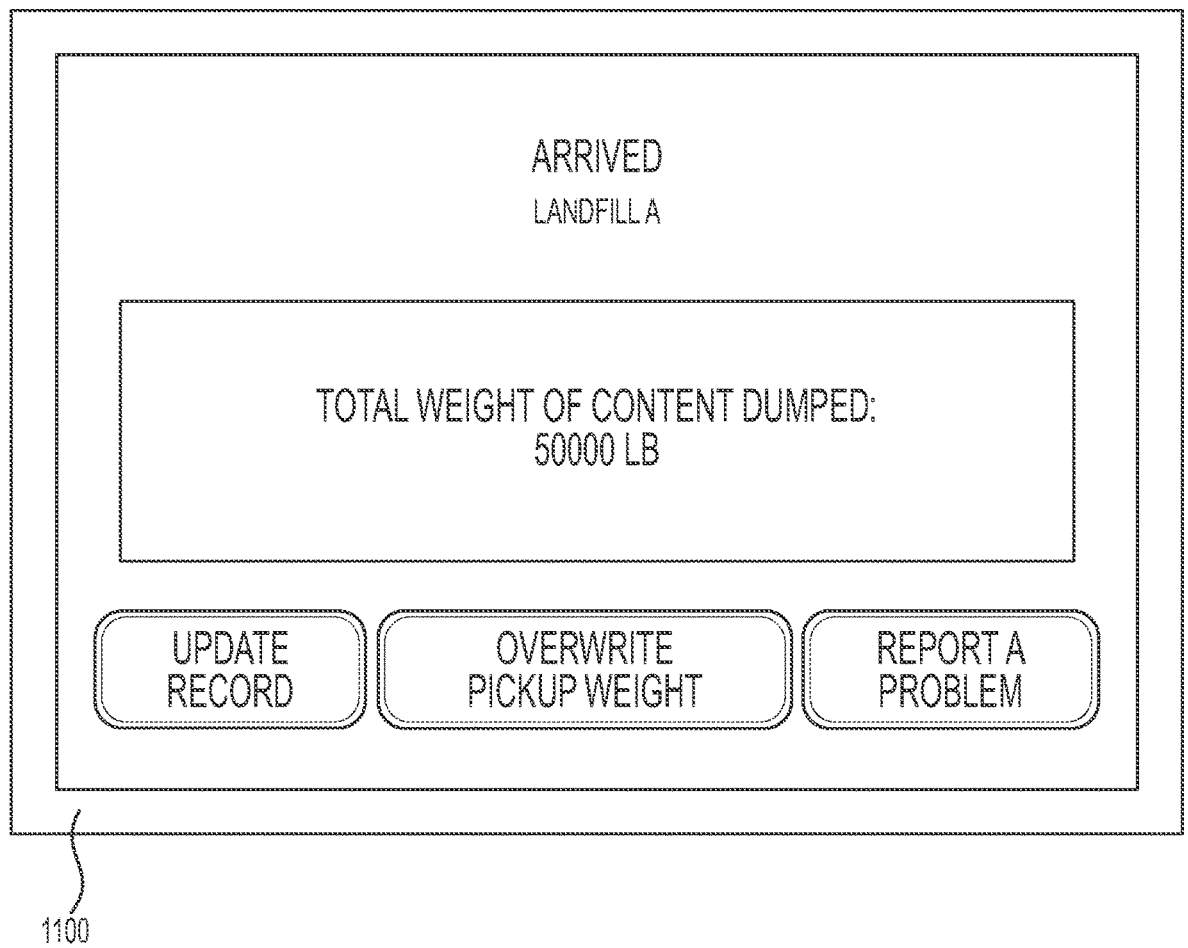

Upon arriving at Landfill A and performing its assigned waste service (i.e., after dumping the contents of bed 16), GUI 1100 of FIG. 11 may be displayed. GUI 1100 may provide an indication of the weight of the waste contents deposited at Landfill A, and a way for the operator to update a status of the waste service. GUI 1100 may be similar to GUI 800, and allow the operator to also overwrite the weight of the deposited waste and/or to report a problem (e.g., via GUI 900).

The interfaces illustrated in FIGS. 3-11 are exemplary only and are provided to highlight certain aspects of the disclosed system. Other views and functionality are contemplated, as would be understood by one of skill in the art. It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system comprising:
   an input device onboard a service vehicle coupled to a first sensor, the first sensor being configured to generate a first signal in response to detected movement associated with waste services that are performed by the service vehicle; and
   a controller in communication with a locating device onboard the service vehicle configured to generate a second signal indicative of a location of the service vehicle, wherein the controller has a central processing unit that executes a waste management application stored on a computer-readable medium to configure the system to:
      determine completion of waste services based on the first signal;
      determine a location of the completed waste services along an assigned route, which comprises a sequence of stops, based on the second signal;
      cause a graphical user interface (GUI) onboard the service vehicle to display a listing of waste services from the route assignment to be performed by the service vehicle and provide an indication of which waste services have been completed; and in response to receiving a selection of an out-of-sequence stop, cause the GUI to display directions to the out-of-sequence stop.

2. The system of claim 1, wherein the first sensor is one of an acoustic sensor and an accelerometer.

3. The system of claim 1, wherein the controller is further configured to cause the GUI to display the location of the service vehicle relative to the location at which waste services are to be performed.

4. The system of claim 1, wherein the first sensor is configured to detect one or more of a group comprising engagement conditions, cycle completion of lift arms, and cycle completion of the in-bed compactor.

5. The system of claim 4, wherein the first sensor is configured to detect lifting, dumping, or shaking of the one or more receptacles.

6. The system of claim 1, wherein:
the input device onboard is further coupled to a second sensor, the second sensor being configured to generate a third signal associated with characteristics of waste material inside one or more receptacles; and
the controller is configured to determine the characteristics of waste material inside the one or more receptacles based on the third signal.

7. The system of claim 6, wherein the second sensor is one of a group of devices, comprising a camera, an infrared (IR) sensor, RADAR sensor, and LIDAR sensor.

8. The system of claim 6, wherein the characteristics of the waste material include one or more of a group comprising load profile, volume, and shape.

9. The system of claim 1, further comprising the GUI, where the controller receives the selection of the out-of-sequence stop via the GUI.

10. The system of claim 1, wherein the controller is communicatively coupled to an offboard controller to receive the selection of the out-of-sequence stop.

11. A method comprising:
determining, by a controller having central processing unit that executes a waste management application, completion of waste services based on a first signal from a first sensor, the first sensor being configured to generate the first signal in response to detecting movement associated with waste services that are performed by the service vehicle;
determining a location of the completion of waste services along an assigned route, which comprises a sequence of stops, based a second signal from a locating device onboard a service vehicle;
causing a graphical user interface (GUI) onboard the service vehicle to display a listing of waste services from the route assignment to be performed by the service vehicle and providing an indication of which waste services have been completed; and
in response to receiving a selection of an out-of-sequence stop, causing the GUI to display directions to the out-of-sequence stop.

12. The method of claim 11, further comprising:
tracking movement of the service vehicle based on the second signal;
making a determination that the service vehicle is approaching a particular location at which waste services are to be performed based on the tracking; and
in response to the determination, causing the graphical user interface to display information associated with the particular location.

13. The method of claim 11, further comprising:
generating a third signal associated with characteristics of waste material inside one or more receptacles using a second sensor onboard the service vehicle; and
determining the characteristics of waste material inside the one or more receptacles based on the third signal.

14. The method of claim 13, further comprising determining the conditions surrounding the one or more receptacles using a fourth signal from the second sensor.

15. The method of claim 14, wherein the conditions surrounding the one or more receptacles are determined before servicing by the service vehicle.

16. The method of claim 13, wherein the second sensor is one of a group of devices, comprising a camera, an infrared (IR) sensor, RADAR sensor, and LIDAR sensor.

17. The method of claim 13, wherein the characteristics of the waste material include one or more of a group comprising load profile, volume, and shape.

18. A system comprising:
a controller in communication with a first sensor and a locating device, wherein the controller has a central processing unit that executes a waste management application stored on a computer-readable medium to configure the system to:
determine completion of waste services based on a first signal from the first sensor, the first sensor being configured to generate the first signal in response to detecting movement associated with waste services that are performed by the service vehicle;
determine a location of the completion of waste services along an assigned route, which comprises a sequence of stops, based on a second signal from the locating device onboard a service vehicle;
cause a graphical user interface (GUI) onboard the service vehicle to display a listing of waste services from the route assignment to be performed by the service vehicle and providing an indication of which waste services have been completed; and
in response to receiving a selection of an out-of-sequence stop, cause the GUI to display directions to the out-of-sequence stop.

19. The system of claim 18, wherein the second sensor is one of a camera a RADAR or LIDAR sensor.

20. The system of claim 18, wherein the controller is configured to:
generate a third signal associated with characteristics of waste material inside one or more receptacles using a second sensor onboard the service vehicle;
determining the characteristics of waste material inside the one or more receptacles based on the third signal.

21. The system of claim 20, wherein the characteristics of the waste material include one or more of a group comprising load profile, volume, and shape.

* * * * *